(12) United States Patent
Jiang et al.

(10) Patent No.: US 10,827,405 B2
(45) Date of Patent: Nov. 3, 2020

(54) INTER-SMALL CELL HANDOVER METHOD, DEVICE, AND SYSTEM

(71) Applicant: Huawei Technologies Co., Ltd., Shenzhen (CN)

(72) Inventors: Guangjian Jiang, Shenzhen (CN); Jingjing Cheng, Shenzhen (CN); Lei Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/246,857

(22) Filed: Jan. 14, 2019

(65) Prior Publication Data

US 2019/0150044 A1    May 16, 2019

Related U.S. Application Data

(63) Continuation of application No. 15/582,345, filed on Apr. 28, 2017, now Pat. No. 10,219,194, which is a
(Continued)

(51) Int. Cl.
*H04W 36/08* (2009.01)
*H04W 76/10* (2018.01)
(Continued)

(52) U.S. Cl.
CPC .......... *H04W 36/08* (2013.01); *H04B 7/0617* (2013.01); *H04B 7/0695* (2013.01);
(Continued)

(58) Field of Classification Search
CPC ... H04W 36/08; H04W 16/18; H04W 56/001; H04W 36/0061; H04W 76/10;
(Continued)

(56) References Cited

U.S. PATENT DOCUMENTS

2005/0176385 A1    8/2005  Stern-Berkowitz et al.
2013/0252612 A1    9/2013  Morimoto et al.
(Continued)

FOREIGN PATENT DOCUMENTS

CN    102123426 A    7/2011
CN    102378260 A    3/2012
(Continued)

OTHER PUBLICATIONS

Kishiyama et al., "Future Steps of LTE-A: Evolution Toward Integration of Local Area and Wide Area Systems," IEEE Wireless Communications pp. 12-18, Institute of Electrical and Electronics Engineers, New York, New York (Feb. 2013).
(Continued)

*Primary Examiner* — Walli Z Butt
(74) *Attorney, Agent, or Firm* — Leydig, Voit & Mayer, Ltd.

(57) ABSTRACT

The present application relates to the field of communications technologies, and provides an inter-small cell handover method, a device, and a system. When UE is in a coverage hole of a serving small cell, the UE needs to perform synchronous measurement only on each available beam pair in a set of available small cells determined by the UE, thereby reducing a delay of re-accessing a high frequency network by the UE, and improving QoS of receiving a high frequency service by the UE. the present application includes: performing, by UE, synchronous measurement, to determine a set of small cells available for the UE; sending the set of available small cells to a macro base station; when the UE is in a coverage hole of a current serving small cell, receiving, by the UE, a first synchronization indication sent by the macro base station.

6 Claims, 10 Drawing Sheets

Related U.S. Application Data continuation of application No. PCT/CN2014/089943, filed on Oct. 30, 2014.

(51) Int. Cl.

| | |
|---|---|
| *H04B 7/06* | (2006.01) |
| *H04L 5/00* | (2006.01) |
| *H04W 36/00* | (2009.01) |
| *H04W 56/00* | (2009.01) |
| *H04W 16/18* | (2009.01) |
| *H04W 24/10* | (2009.01) |
| *H04W 36/16* | (2009.01) |
| *H04W 36/30* | (2009.01) |
| *H04W 84/04* | (2009.01) |

(52) U.S. Cl.
CPC .......... *H04L 5/0048* (2013.01); *H04W 16/18* (2013.01); *H04W 36/0061* (2013.01); *H04W 56/001* (2013.01); *H04W 76/10* (2018.02); *H04W 24/10* (2013.01); *H04W 36/16* (2013.01); *H04W 36/30* (2013.01); *H04W 84/045* (2013.01)

(58) Field of Classification Search
CPC ... H04W 84/045; H04W 36/30; H04W 36/16; H04W 24/10; H04B 7/0695; H04B 7/0617; H04L 5/0048
See application file for complete search history.

(56) References Cited

U.S. PATENT DOCUMENTS

| | | | |
|---|---|---|---|
| 2014/0004863 A1 | 1/2014 | Zhang et al. | |
| 2014/0321375 A1 | 10/2014 | Agiwal | |
| 2015/0009984 A1* | 1/2015 | Jung | H04W 56/0055 370/350 |
| 2015/0304868 A1* | 10/2015 | Yu | H04W 56/001 370/312 |
| 2015/0304916 A1 | 10/2015 | Wang et al. | |
| 2016/0157116 A1 | 6/2016 | Zhang | |
| 2016/0345216 A1* | 11/2016 | Kishiyama | H04W 36/0083 |
| 2017/0055202 A1 | 2/2017 | Uchiyama | |
| 2017/0251444 A1 | 8/2017 | Huang | |
| 2017/0257780 A1 | 9/2017 | Ryoo | |
| 2017/0311217 A1* | 10/2017 | Jung | H04W 36/04 |

FOREIGN PATENT DOCUMENTS

| | | |
|---|---|---|
| CN | 102469557 A | 5/2012 |
| CN | 102695228 A | 9/2012 |
| CN | 103874151 A | 6/2014 |
| EP | 1507427 A1 | 2/2005 |

OTHER PUBLICATIONS

"Discussion on Small Cell handover," 3GPP TSG RAN WG1 Meeting #72, St. Julian's, Malta, R1-130358, 3rd Generation Partnership Project, Valbonne, France (Jan. 28-Feb. 1, 2013).

"Inter-freq mobility among small cells in scenario 3," 3GPP TSG-RAN WG2 Meeting #82, Fukuoka, Japan, R2-131843, 3rd Generation Partnership Project, Valbonne, France (May 20-24, 2013).

"Discussion on dynamic On/Off scheme," 3GPP TSG RAN WG1 Meeting #74, Barcelona, Spain, R1-133278, 3rd Generation Partnership Project, Valbonne, France (Aug. 19-23, 2013).

U.S. Appl. No. 15/582,345, filed Apr. 28, 2017.

\* cited by examiner

INTER-SMALL CELL HANDOVER METHOD, DEVICE, AND SYSTEM

CROSS-REFERENCE TO RELATED APPLICATIONS

This application is a continuation of U.S. patent application Ser. No. 15/582,345, filed on Apr. 28, 2017, which is a continuation of International Application No. PCT/CN2014/089943, filed on Oct. 30, 2014. All of the afore-mentioned patent applications are hereby incorporated by reference in their entireties.

TECHNICAL FIELD

The present application relates to the field of communications technologies, and in particular, to an inter-small cell handover method, a device, and a system.

BACKGROUND

With continuous development of broadband wireless communications technologies, mobile broadband traffic in the future will be more than a thousandfold of current mobile broadband traffic. To meet the development, using a high frequency band having a high rate and high bandwidth to perform data communication is bound to become a development trend of a broadband wireless communications system. FIG. 1 is a schematic diagram of an architecture of a high frequency network. As shown in FIG. 1, the high frequency network includes: one macro base station, a user equipment (UE), and multiple small cells (including a serving small cell performing data communication with the UE) in a coverage area of the macro base station. A small cell may perform data service transmission with the UE by using a high frequency band.

Compared with a low frequency signal, a high frequency signal has a severer transmission loss and a poorer penetration capability. Therefore, with impact of factors such as blocking of a building, blocking of a human body, and misalignment of a high frequency signal beam, the UE is extremely easily located in a coverage hole of the serving small cell. Consequently, a high frequency signal received by the UE is too poor to be demodulated, or the UE fails to receive a high frequency signal sent by the serving small cell, thereby affecting quality of receiving a high frequency service by the UE and a probability that the UE receives the high frequency service. Therefore, when the UE is in the coverage hole of the serving small cell, a corresponding measure needs to be taken, to reduce a probability that receiving a high frequency service by the UE is interrupted, and maintain continuity of data communication.

To resolve the foregoing problem, currently, in a high frequency network communications system, when the UE is in a coverage hole of a serving small cell, the UE performs synchronous measurement on all high frequency beams of all small cells around the UE by using an initial synchronous measurement method, selects an optimal small cell and beam pair for re-access, and receives high frequency data sent by the small cell, ensuring continuity of high frequency data communication. However, in this implementation method, the UE needs to perform synchronous measurement on all the beams of all the small cells, complexity is relatively high, and a synchronous measurement time is relatively long, thereby leading to a relatively large delay of re-access of the UE to another small cell, and reducing quality of service (QoS) of the UE.

SUMMARY

Embodiments of the present application provide an inter-small cell handover method, a device, and a system, so as to resolve a problem that when the UE is in a coverage hole of a serving small cell, the UE performs synchronous measurement on all beams of all small cells, causing a relatively large access delay, and relatively low QoS of receiving a high frequency service by the UE.

To achieve the foregoing objective, the following technical solutions are used in the embodiments of the present application:

According to a first aspect, an embodiment of the present application provides an inter-small cell handover method, including:

performing, by the UE, synchronous measurement, to determine a set of small cells available for the UE, where the set of available small cells includes at least one available small cell, and an available beam pair of each available small cell, and the available beam pair consists of a high frequency beam of the UE and a high frequency beam of the available small cell;

sending, by the UE, the set of available small cells to a macro base station;

when the UE is in a coverage hole of a current serving small cell, receiving a first synchronization indication sent by the macro base station, where the first synchronization indication is used to instruct the UE to perform synchronous measurement on the high frequency beam of the UE in each available beam pair;

performing, by the UE, synchronous measurement according to the first synchronization indication, to select an available target beam pair; and handing over, by the UE, to a target small cell corresponding to the available target beam pair.

According to a second aspect, an embodiment of the present application provides an inter-small cell handover method, including:

receiving, by a macro base station, a set of small cells available for UE that is sent by the UE, where the set of available small cells includes at least one available small cell, and an available beam pair of each available small cell, and the available beam pair consists of a high frequency beam of the UE and a high frequency beam of the available small cell;

receiving, by the macro base station, a coverage hole status indication sent by a current serving small cell of the UE, where the coverage hole status indication is used to indicate whether the UE is in a coverage hole of the current serving small cell; and when the UE is in the coverage hole of the current serving small cell, sending, by the macro base station, a first synchronization indication to the UE, and separately sending a second synchronization indication to each available small cell in the set of available small cells, so that the UE performs synchronous measurement according to the first synchronization indication, selects an available target beam pair, and hands over from the current serving small cell of the UE to a target small cell corresponding to the available target beam pair, where the first synchronization indication is used to instruct the UE to perform synchronous measurement on the high frequency beam of the UE in each available beam pair, and the second synchronization indication is used to instruct the available small cell to send a synchronization pilot signal to the UE on the high frequency beam in the available beam pair of the available small cell.

According to a third aspect, an embodiment of the present application provides an inter-small cell handover method, including:

sending a first synchronization pilot signal to the UE, so that the UE measures the synchronization pilot signal, and determines an available small cell of the UE and an available beam pair of the available small cell, where the available beam pair consists of a high frequency beam of the available small cell and a high frequency beam of the UE;

receiving, by the available small cell, a synchronization indication sent by a macro base station, where the synchronization indication instructs the available small cell to send a synchronization pilot signal to the UE on the high frequency beam in the available beam pair of the available small cell;

sending, by the available small cell, a second synchronization pilot signal to the UE according to the synchronization indication, so that the UE performs synchronous measurement on the high frequency beam of the UE in the available beam pair, determines an available target beam pair, and hands over from a current serving small cell of the UE to a target small cell corresponding to the available target beam pair; and receiving, by the target small cell, a data transmission indication sent by the macro base station, to perform data transmission with the UE by using the available target beam pair.

According to a fourth aspect, an embodiment of the present application provides user equipment, where the user equipment includes:

a determining unit, configured to perform synchronous measurement, to determine a set of small cells available for the UE, where the set of available small cells includes at least one available small cell, and an available beam pair of each available small cell, and the available beam pair consists of a high frequency beam of the UE and a high frequency beam of the available small cell;

a sending unit, configured to send the set of available small cells to a macro base station;

a receiving unit, configured to: when the UE is in a coverage hole of a current serving small cell, receive a first synchronization indication sent by the macro base station, where the first synchronization indication is used to instruct the UE to perform synchronous measurement on the high frequency beam of the UE in each available beam pair;

a selection unit, configured to perform synchronous measurement according to the first synchronization indication, to select an available target beam pair; and a handover unit, configured to hand over to a target small cell corresponding to the available target beam pair.

According to a fifth aspect, an embodiment of the present application provides a macro base station, where the macro base station includes:

a receiving unit, configured to: receive a set of available small cells sent by the UE, where the set of available small cells includes at least one available small cell, and an available beam pair of each available small cell, and the available beam pair consists of a high frequency beam of the UE and a high frequency beam of the available small cell; and receive a coverage hole status indication sent by a serving small cell of the UE, where the coverage hole status indication is used to indicate whether the UE is in a coverage hole of the serving small cell; and a sending unit, configured to: when the UE is in the coverage hole of the current serving small cell, send a first synchronization indication to the UE, and separately send a second synchronization indication to each available small cell in the set of available small cells, so that the UE performs synchronous measurement according to the first synchronization indication, selects an available target beam pair, and hands over from the current serving small cell of the UE to a target small cell corresponding to the available target beam pair, where the first synchronization indication is used to instruct the UE to perform synchronous measurement on the high frequency beam of the UE in each available beam pair, and the second synchronization indication is used to instruct the available small cell to send a synchronization pilot signal to the UE on the high frequency beam in the available beam pair of the available small cell.

According to a sixth aspect, an embodiment of the present application provides a small cell, where the small cell includes:

a sending unit, configured to send a first synchronization pilot signal to the UE, so that the UE measures the synchronization pilot signal, and determines an available small cell of the UE and an available beam pair of the available small cell, where the available beam pair consists of a high frequency beam of the available small cell and a high frequency beam of the UE;

a receiving unit, configured to receive a synchronization indication sent by a macro base station, where the synchronization indication instructs the available small cell to send a synchronization pilot signal to the UE on the high frequency beam in the available beam pair of the available small cell, where the sending unit is further configured to send a second synchronization pilot signal to the UE according to the synchronization indication, so that the UE performs synchronous measurement on the high frequency beam of the UE in the available beam pair, determines an available target beam pair, and hands over from a current serving small cell of the UE to a target small cell corresponding to the available target beam pair; and the receiving unit is further configured to receive a data transmission indication sent by the macro base station; and a data communications unit, configured to perform data transmission with the UE by using the available target beam pair.

According to a seventh aspect, an embodiment of the present application provides an inter-small cell handover system, including the user equipment according to any one of the fourth aspect or the first to the third possible implementation manners of the fourth aspect, the macro base station according to any one of the fifth aspect or the first or the second possible implementation manner of the fifth aspect, and at least one small cell according to any one of the sixth aspect or the first to the third possible implementation manners of the sixth aspect.

According to an eighth aspect, an embodiment of the present application provides user equipment, where the user equipment includes:

a processor, configured to perform synchronous measurement, to determine a set of small cells available for the UE, where the set of available small cells includes at least one available small cell, and an available beam pair of each available small cell, and the available beam pair consists of a high frequency beam of the UE and a high frequency beam of the available small cell;

a communications unit, configured to: send the set of available small cells to a macro base station; and when the UE is in a coverage hole of a current serving small cell, receive a first synchronization indication sent by the macro base station, where the first synchronization indication is used to instruct the UE to perform synchronous measurement on the high frequency beam of the UE in each available beam pair; and the processor is further configured to perform synchronous measurement according to the first synchronization indication, to select an available target beam pair; and hand over to a target small cell corresponding to the available target beam pair.

According to a ninth aspect, an embodiment of the present application provides a macro base station, where the macro base station includes:

a communications unit, configured to: receive a set of available small cells sent by the UE, where the set of available small cells includes at least one available small cell, and an available beam pair of each available small cell, and the available beam pair consists of a high frequency beam of the UE and a high frequency beam of the available small cell; and receive a coverage hole status indication sent by a serving small cell of the UE, where the coverage hole status indication is used to indicate whether the UE is in a coverage hole of the serving small cell; and when the UE is in the coverage hole of the current serving small cell, send a first synchronization indication to the UE, and separately send a second synchronization indication to each available small cell in the set of available small cells, so that the UE performs synchronous measurement according to the first synchronization indication, selects an available target beam pair, and hands over from the current serving small cell of the UE to a target small cell corresponding to the available target beam pair, where the first synchronization indication is used to instruct the UE to perform synchronous measurement on the high frequency beam of the UE in each available beam pair, and the second synchronization indication is used to instruct the available small cell to send a synchronization pilot signal to the UE on the high frequency beam in the available beam pair of the available small cell.

According to a tenth aspect, an embodiment of the present application provides a small cell, where the small cell includes:

a communications unit, configured to: send a first synchronization pilot signal to the UE, so that the UE measures the synchronization pilot signal, and determines an available small cell of the UE and an available beam pair of the available small cell, where the available beam pair consists of a high frequency beam of the available small cell and a high frequency beam of the UE;

receive a synchronization indication sent by a macro base station, where the synchronization indication instructs the available small cell to send a synchronization pilot signal to the UE on the high frequency beam in the available beam pair of the available small cell;

send a second synchronization pilot signal to the UE according to the synchronization indication, so that the UE performs synchronous measurement on the high frequency beam of the UE in the available beam pair, determines an available target beam pair, and hands over from a current serving small cell of the UE to a target small cell corresponding to the available target beam pair;

receive a data transmission indication sent by the macro base station; and perform data transmission with the UE by using the available target beam pair.

According to an eleventh aspect, an embodiment of the present application provides an inter-small cell handover system, including the user equipment according to any one of the eighth aspect or the first to the third possible implementation manners of the eighth aspect, the macro base station according to any one of the ninth aspect or the first or the second possible implementation manner of the ninth aspect, and the small cell according to any one of the tenth aspect or the first to the third possible implementation manners of the tenth aspect.

It can be known from the foregoing that, by means of the inter-small cell handover method and the device that are provided in the embodiments of the present application, the UE performs synchronous measurement, to determine a set of small cells available for the UE; sends the set of available small cells to a macro base station; when the UE is in a coverage hole of a serving small cell, receives a first synchronization indication sent by the macro base station; performs synchronous measurement according to the first synchronization indication, to select an available target beam pair; and hands over to a target small cell corresponding to the available target beam pair. In this way, when the UE is in the coverage hole of the serving small cell, as long as the UE performs synchronous measurement on each available beam pair in the set of available small cells determined by the UE, the UE can select an optimal target small cell and target beam pair, and hands over to the target small cell, thereby reducing a delay of re-accessing a high frequency network by the UE, improving QoS of receiving a high frequency service by the UE, and avoiding a problem in the prior art that the UE needs to perform synchronous measurement on all beam pairs of all small cells, and a synchronous measurement time is long, causing a relatively large delay of re-accessing a high frequency network by the UE, and relatively poor QoS of receiving a high frequency service by the UE.

BRIEF DESCRIPTION OF DRAWINGS

To describe the technical solutions in the embodiments of the present application or in the prior art more clearly, the following briefly describes the accompanying drawings required for describing the embodiments or the prior art. Apparently, the accompanying drawings in the following description show merely some embodiments of the present application, and persons of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. Apparently, the described embodiments are merely some but not all of the embodiments of the present application. All other embodiments obtained by persons of ordinary skill in the art based on the embodiments of the present application without creative efforts shall fall within the protection scope of the present application.

Figure 1:
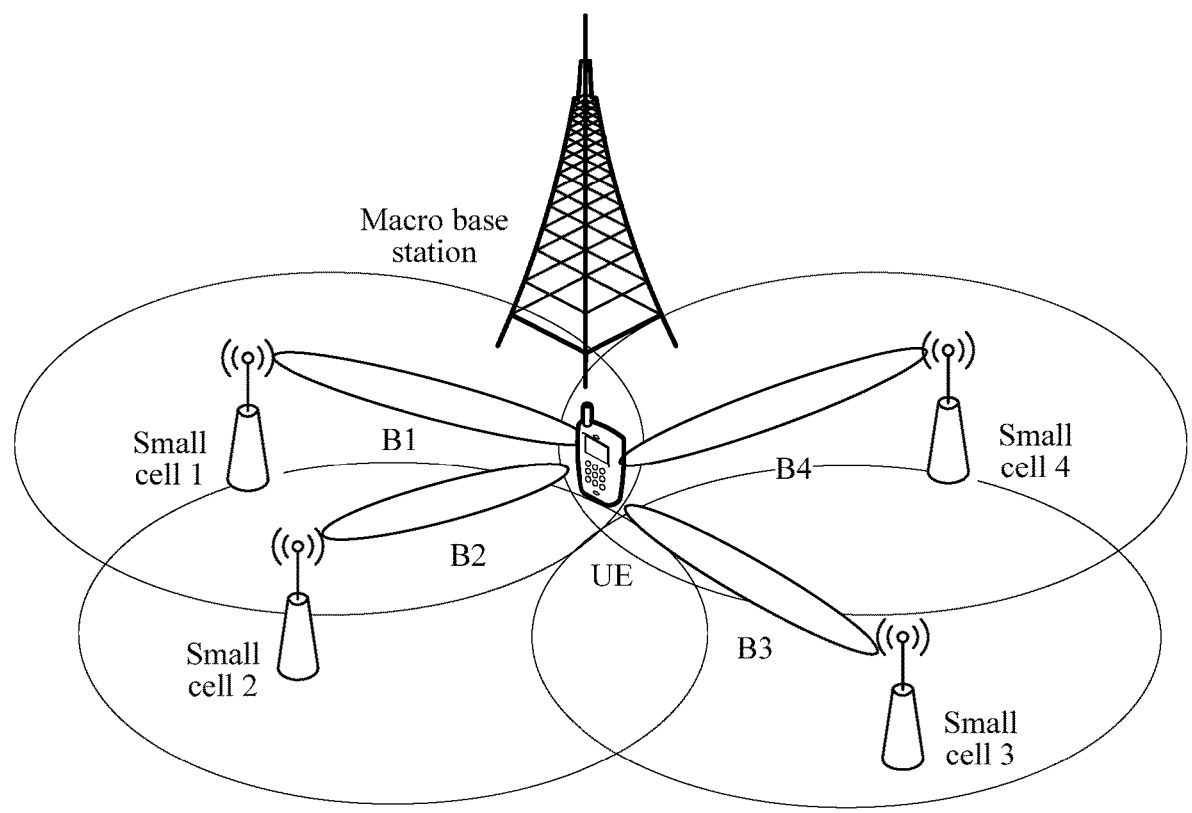
FIG. 1 is a schematic diagram of an architecture of a high frequency network.

An inter-small cell handover method provided in an embodiment of the present application is applicable to a high frequency network architecture shown in FIG. 1, and is also applicable to an inter-small cell handover in any other coordinated communications scenario. This is not limited in the present application. Only an example of an inter-small cell handover in the high frequency network architecture shown in FIG. 1 is used in this embodiment of the present application for description.

In the high frequency network architecture shown in FIG. 1, a small cell 1 is a serving small cell of the UE, and a small cell 2, a small cell 3, and a small cell 4 are small cells that are in a coverage area of a macro base station and that are neighboring to the serving small cell of the UE. Each small cell can separately generate 10 high frequency beams, and the UE can generate four high frequency beams: a beam 1, a beam 2, a beam 3, and a beam 4. When the UE is in a coverage hole of the serving small cell 1, if an existing method for reducing an interruption probability of high frequency data communication of the UE is used, the UE needs to separately measure, on the beam 1 of the UE, synchronization pilot signals that are sent by the small cell 2 on 10 high frequency beams of the small cell 2, by the small cell 3 on 10 high frequency beams of the small cell 3, and by the small cell 4 on 10 high frequency beams of the small cell 4; the UE needs to separately measure, on the beam 2 of the UE, the synchronization pilot signals that are sent by the small cell 2 on the 10 high frequency beams of the small cell 2, by the small cell 3 on the 10 high frequency beams of the small cell 3, and by the small cell 4 on the 10 high frequency beams of the small cell 4; the UE needs to separately measure, on the beam 3 of the UE, the synchronization pilot signals that are sent by the small cell 2 on the 10 high frequency beams of the small cell 2, by the small cell 3 on the 10 high frequency beams of the small cell 3, and by the small cell 4 on the 10 high frequency beams of the small cell 4; and the UE needs to separately measure, on the beam 4 of the UE, the synchronization pilot signals that are sent by the small cell 2 on the 10 high frequency beams of the small cell 2, by the small cell 3 on the 10 high frequency beams of the small cell 3, and by the small cell 4 on the 10 high frequency beams of the small cell 4, select a small cell and a beam pair that correspond to a synchronization pilot signal having a highest received signal strength, access the selected small cell, and perform high frequency data transmission by using the selected beam pair.

Figure 2:
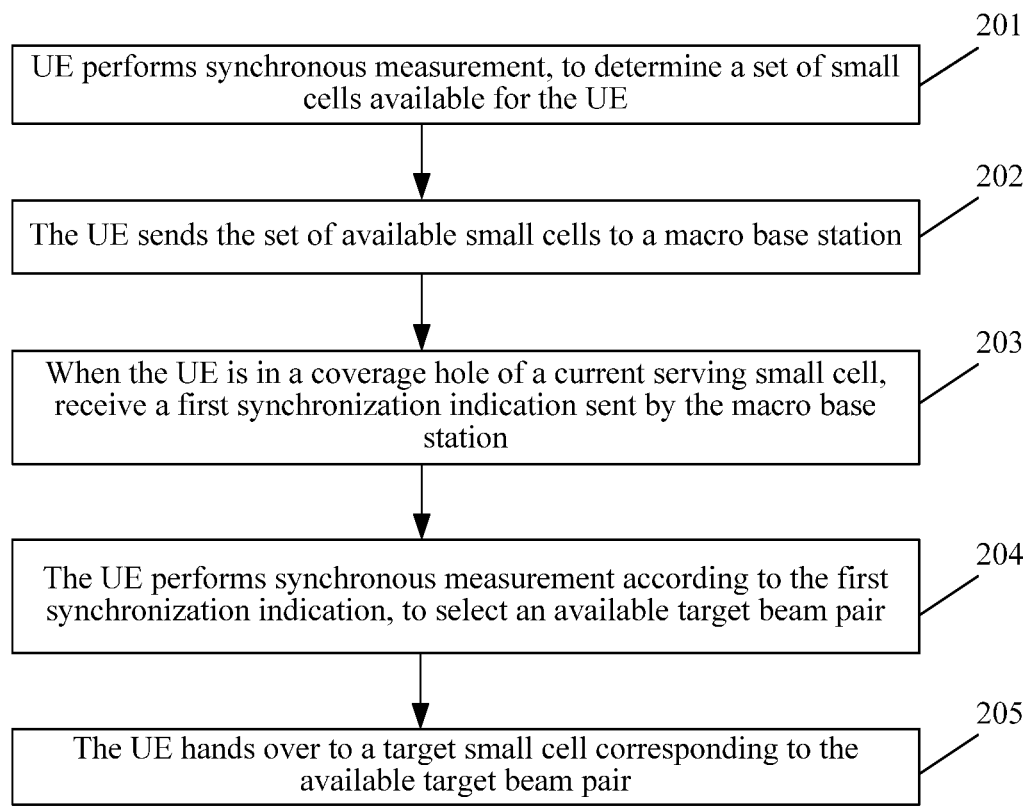
FIG. 2 is a flowchart of an inter-small cell handover method according to an embodiment of the present application.

It is not difficult to understand that, in the high frequency network architecture shown in FIG. 1, when the UE is in a coverage hole of a serving small cell, if an existing inter-small cell handover technology is used, the UE cannot select an optimal small cell and beam pair to re-access a high frequency network, until the UE performs 4×3×10=120 times of synchronous measurement, that is, a quantity of times of synchronous measurement performed by the UE in an inter-small cell handover process has a great relationship with a quantity of small cells around the UE and a quantity of high frequency beams that can be generated by each small cell. In this case, the quantity of small cells around the UE or the quantity of high frequency beams generated by each small cell or both are extremely large. If the UE needs to perform synchronous measurement with all neighboring small cells of the serving small cell to select an optimal available small cell, a quantity of times of synchronous measurement is relatively large, and a synchronous measurement time is relatively long, thereby causing a relatively large delay of re-accessing another small cell by the UE, and reducing QoS of receiving a high frequency service by the UE. Therefore, this embodiment of the present application provides the inter-small cell handover method. The inter-small cell handover method is applied to the high frequency network architecture shown in FIG. 1. Referring to FIG. 2, the method may include the following steps.

201. The UE performs synchronous measurement, to determine a set of small cells available for the UE.

The set of available small cells includes at least one available small cell, and an available beam pair of each available small cell, and the available beam pair consists of a high frequency beam of the UE and a high frequency beam of the available small cell.

Preferably, the UE may perform synchronous measurement upon being powered on, to determine the set of small cells available for the UE while a serving small cell of the UE is determined; or may perform synchronous measurement when a user requests to establish a connection, to determine a serving small cell of the UE and the set of small cells available for the UE; or may periodically perform synchronous measurement while the UE receives high frequency data sent by a serving small cell, to determine the set of small cells available for the UE.

Specifically, the UE may use the following method to perform synchronous measurement, to determine the serving small cell of the UE and the set of available small cells:

sending, by the UE, a synchronous measurement request to the macro base station, so that the macro base station instructs all small cells in a coverage area of the macro base station to send synchronization pilot signals to the UE;

separately receiving, by the UE on each high frequency beam of the UE, the synchronization pilot signal sent by all the small cells on each high frequency beam of the small cells;

separately measuring, by the UE, a signal strength of each synchronization pilot signal, and sorting the signal strengths in descending order; and determining, by the UE, a small cell sending a synchronization pilot signal having a highest signal strength as a serving small cell of the UE; and determining at least one small cell sending a synchronization pilot signal having a second highest signal strength as an available small cell in the set of small cells available for the UE.

The signal strength may be a measured RSRP (reference signal received power) value of a reference signal of a current neighboring small cell or a measured RSRQ (Reference Signal Received Quality) value of a reference signal of a current neighboring small cell.

For example, as shown in FIG. 1, after performing initial synchronous measurement, the UE determines the small cell 1 as the serving small cell of the UE, determines that available small cells in the set of available small cells are the small cell 2 and the small cell 3, determines that an available beam pair corresponding to the small cell 2 is (a high frequency beam 2 of the UE, a high frequency beam 4 of the small cell 2), and determines that an available beam pair corresponding to the small cell 3 is (a high frequency beam 3 of the UE, a high frequency beam 6 of the small cell 3).

202. The UE sends the set of available small cells to the macro base station.

Preferably, the UE may send the set of available small cells to the macro base station by using a low frequency channel, so that the macro base station identifies the UE according to information about whether the received set of available small cells includes an available small cell. Preferably, if an available small cell is included, the UE is identified as a user that can hand over between small cells, so as to initiate the inter-small cell handover process in the present application when the UE is in the coverage hole of the serving small cell. If no available small cell is included, the UE is considered by default as or is identified as a user that cannot hand over between small cells.

203. When the UE is in a coverage hole of a current serving small cell, receive a first synchronization indication sent by the macro base station.

The first synchronization indication is used to instruct the UE to perform synchronous measurement on the high frequency beam of the UE in each available beam pair.

Preferably, the UE may receive, on a low frequency channel, the first synchronization indication sent by the macro base station.

For example, if the available beam pair determined in step 201 is (the high frequency beam 2 of the UE, the high frequency beam 4 of the small cell 2) and (the high frequency beam 3 of the UE, the high frequency beam 6 of the small cell 3), the first synchronization indication is used to instruct the UE to separately receive, on the high frequency beam 2 and the high frequency beam 3 of the UE, a synchronization pilot signal sent by a small cell, to perform synchronous measurement.

204. The UE performs synchronous measurement according to the first synchronization indication, to select an available target beam pair.

The available target beam pair is a beam pair having a good channel quality and meeting a high frequency data transmission requirement.

Preferably, the UE may use the following method to select the available target beam pair:

measuring, by the UE, a signal strength of a synchronization pilot signal on the high frequency beam of the UE in each available beam pair; and if the signal strength corresponding to the synchronization pilot signal having the highest signal strength is greater than or equal to a preset threshold, selecting, as the available target beam pair, a beam pair consisting of a high frequency beam, of the UE, on which the synchronization pilot signal having the highest signal strength is received and a high frequency beam of an available small cell sending the synchronization pilot signal having the highest signal strength.

If the signal strength of the synchronization pilot signal having the highest signal strength is less than or equal to the preset threshold, the UE uses an existing inter-small cell handover method to perform synchronous measurement on all beams of all small cells, to select an optimal beam pair.

The preset threshold is set as required, and is not limited in this embodiment of the present application. If a signal strength of a synchronization pilot signal is greater than or equal to the preset threshold, it indicates that quality of a channel on which the synchronization pilot signal is sent and received meets a requirement of a high frequency data transmission channel in the high frequency network architecture. If a signal strength of a synchronization pilot signal is less than the preset threshold, it indicates that quality of a channel on which the synchronization pilot signal is sent and received cannot meet a requirement of a high frequency data transmission channel in the high frequency network architecture, and the channel is an unavailable high frequency transmission channel.

For example, when the UE in FIG. 1 is in the coverage hole of the serving small cell, the UE needs to perform synchronous measurement only on the available beam pairs (the high frequency beam 2 of the UE, the high frequency beam 4 of the small cell 2) and (the high frequency beam 3 of the UE, the high frequency beam 6 of the small cell 3), to select an available target beam pair from the two beam pairs, that is, an optimal beam pair can be determined as long as synchronous measurement is performed twice. Compared with an existing method in which an optimal beam pair cannot be determined until synchronous measurement is performed 120 times, this greatly reduces a quantity of times of synchronous measurement, and reduces a synchronous measurement time. Therefore, a time is saved for a small cell handover of the UE in step 205, a delay of re-accessing a high frequency network by the UE is reduced, and QoS of receiving a high frequency service by the UE is improved.

205. The UE hands over to a target small cell corresponding to the available target beam pair.

Further, the method further includes:

sending, by the UE, a handover result to the macro base station, so that the macro base station instructs, according to the handover result, to perform data transmission between the target small cell and the UE by using the available target beam pair, and instructs the serving small cell to terminate data transmission with the UE, where the handover result includes the available target beam pair and a cell identifier of the target small cell; and receiving a data transmission indication sent by the macro base station, to perform data transmission with the target small cell by using the available target beam pair, where the data transmission indication is used to instruct to perform data transmission between the target small cell and the UE by using the available target beam pair.

It can be known from the foregoing that, by means of the inter-small cell handover method provided in this embodiment of the present application, the UE performs synchronous measurement, to determine a set of small cells available for the UE; sends the set of available small cells to a macro base station; when the UE is in a coverage hole of a current serving small cell, performs synchronous measurement according to a first synchronization indication, to select an available target beam pair; and hands over to a target small cell corresponding to the available target beam pair. In this way, when the UE is in the coverage hole of the serving small cell, as long as the UE performs synchronous measurement on each available beam pair in the set of available small cells determined by the UE, the UE can select an optimal small cell and beam pair, access the selected small cell, and continuously perform high frequency data transmission by using the selected beam pair, thereby reducing a synchronous measurement time, further reducing a delay of re-accessing a high frequency network by the UE, improving QoS of receiving a high frequency service by the UE, and avoiding a problem in the prior art that the UE needs to perform synchronous measurement on all beam pairs of all small cells, and a synchronous measurement time is long, causing a relatively large delay of re-accessing a high frequency network by the UE, and relatively poor QoS of receiving a high frequency service by the UE.

Figure 3:
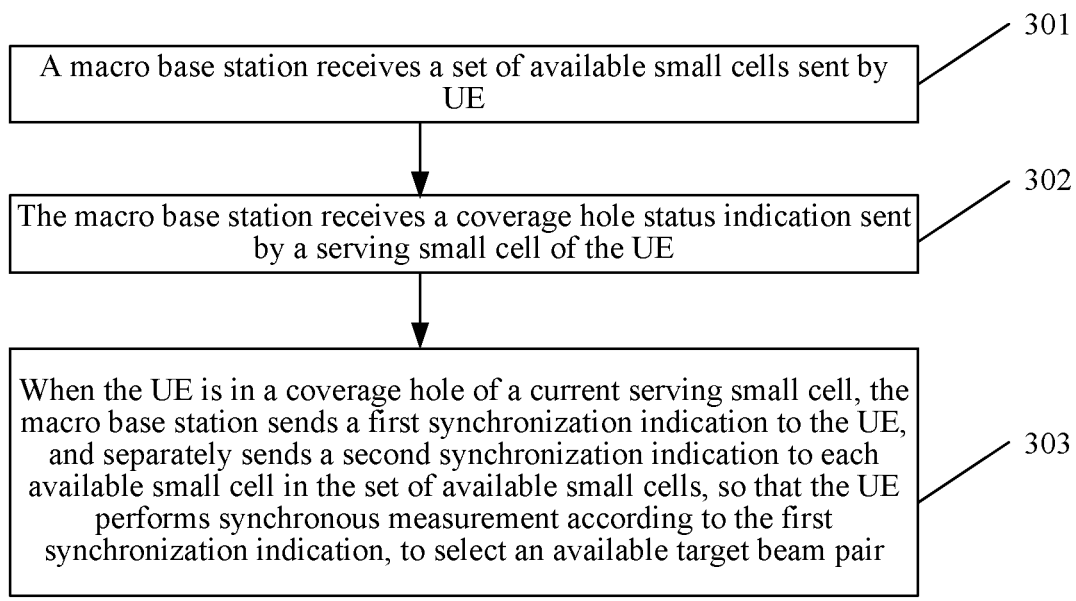
FIG. 3 is a flowchart of an inter-small cell handover method according to an embodiment of the present application.

In addition, an embodiment of the present application further provides an inter-small cell handover method. As shown in FIG. 3, the method may include the following steps.

301. A macro base station receives a set of available small cells sent by the UE.

The set of available small cells includes at least one available small cell, and an available beam pair of each available small cell, and the available beam pair consists of a high frequency beam of the UE and a high frequency beam of the available small cell.

302. The macro base station receives a coverage hole status indication sent by a serving small cell of the UE.

The coverage hole status indication is used to indicate whether the UE is in a coverage hole of the serving small cell.

Preferably, the macro base station may receive, on a low frequency channel, the coverage hole status indication sent by the serving small cell.

303. When the UE is in a coverage hole of a current serving small cell, the macro base station sends a first synchronization indication to the UE, and separately sends a second synchronization indication to each available small cell in the set of available small cells, so that the UE performs synchronous measurement according to the first synchronization indication, to select an available target beam pair.

The first synchronization indication is used to instruct the UE to perform synchronous measurement on the high frequency beam of the UE in each available beam pair. The second synchronization indication is used to instruct the available small cell to send a synchronization pilot signal to the UE on the high frequency beam in the available beam pair of the available small cell.

Further, the method further includes:

receiving, by the macro base station, a handover result sent by the UE, where the handover result includes the available target beam pair and a cell identifier of a target small cell corresponding to the available target beam pair; and instructing, according to the handover result, to perform data transmission between the target small cell and the UE by using the available target beam pair, and instructing the serving small cell to terminate data transmission with the UE.

Further, to ensure that the UE receives, as quickly as possible when the UE is in the coverage hole of the current serving small cell, data transmitted by the target small cell on a high frequency channel, and reduces a connection delay of a high frequency data service, before the macro base station instructs the target small cell to perform data transmission to the UE by using the available target beam pair, the method may further include:

grouping, by the macro base station into one group, an available small cell that is in the set of available small cells and that is in a same coverage area of the macro base station; and after receiving the coverage hole status indication sent by the serving small cell of the UE, separately sending, by the macro base station in a multicast form to each group of available small cells, data that the UE requests to transmit.

In this way, before synchronous measurement is performed on a UE side to determine the available target beam pair, the macro base station first sends, in a multicast form to each small cell in the set of available small cells by means of data transmission, the data requested by the UE, so that after receiving the handover result, the macro base station directly commands the target small cell to perform data transmission to the UE, rather than transmitting, to the target small cell after the handover result is received, the data requested by the UE, to enable the target small cell to perform data transmission to the UE.

It can be known from the foregoing that, by means of the inter-small cell handover method provided in this embodiment of the present application, after a macro base station receives a set of available small cells sent by the UE and a coverage hole status indication sent by a current serving small cell of the UE, when the UE is in a coverage hole of the current serving small cell, the macro base station sends a first synchronization indication to the UE, and separately sends a second synchronization indication to each available small cell in the set of available small cells, so that the UE performs synchronous measurement according to the first synchronization indication, to select an available target beam pair. The first synchronization indication is used to instruct the UE to perform synchronous measurement on a high frequency beam of the UE in each available beam pair, and the second synchronization indication is used to instruct the available small cell to send a synchronization pilot signal to the UE on a high frequency beam in the available beam pair of the available small cell. In this way, after the macro base station receives information that is sent by the serving small cell and that the UE is in a coverage hole of the serving small cell, the macro base station commands the UE to perform synchronous measurement on the available beam pair in the determined set of available small cells, so that a quantity of times of synchronous measurement performed by the UE is greatly reduced, and a measurement time is reduced. Therefore, a delay of re-accessing a high frequency network by the UE is reduced, and high frequency QoS of the UE is improved.

Figure 4:
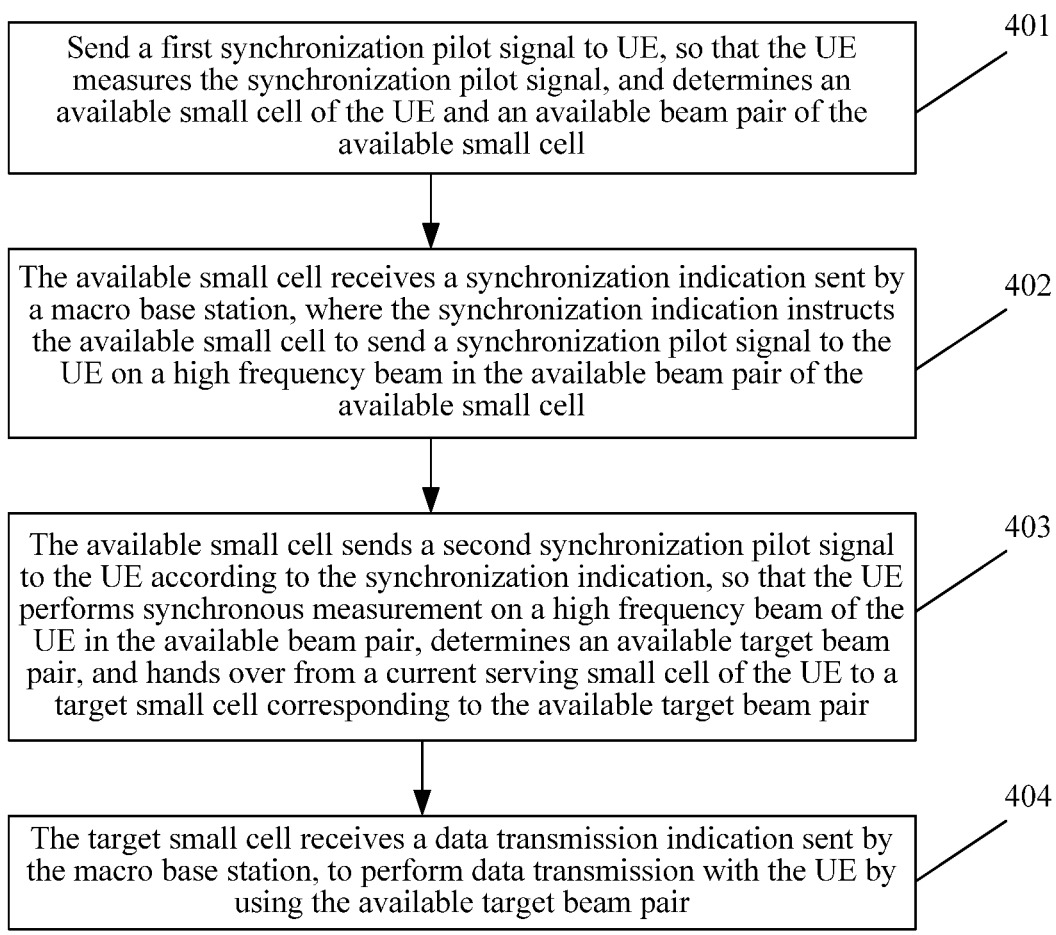
FIG. 4 is a flowchart of an inter-small cell handover method according to an embodiment of the present application.

In addition, an embodiment of the present application further provides an inter-small cell handover method. As shown in FIG. 4, the method may include the following steps.

401. Send a first synchronization pilot signal to the UE, so that the UE measures the synchronization pilot signal, and determines an available small cell of the UE and an available beam pair of the available small cell.

The available beam pair consists of a high frequency beam of the available small cell and a high frequency beam of the UE.

402. The available small cell receives a synchronization indication sent by a macro base station, where the synchronization indication instructs the available small cell to send a synchronization pilot signal to the UE on a high frequency beam in the available beam pair of the available small cell.

403. The available small cell sends a second synchronization pilot signal to the UE according to the synchronization indication, so that the UE performs synchronous measurement on a high frequency beam of the UE in the available beam pair, determines an available target beam pair, and hands over from a current serving small cell of the UE to a target small cell corresponding to the available target beam pair.

404. The target small cell receives a data transmission indication sent by the macro base station, to perform data transmission with the UE by using the available target beam pair.

Further, before step 404, the method further includes:

receiving, by the available small cell, data that is sent by the macro base station in a multicast form and that the UE requests to transmit.

Further, when the small cell is the current serving small cell of the UE, the method further includes:

determining whether the UE is in a coverage hole of the current serving small cell;

sending a coverage hole status indication to the macro base station, where the coverage hole status indication is used to indicate whether the UE is in the coverage hole of the small cell; and when the UE is in the coverage hole of the current serving small cell, receiving, by the current serving small cell, indication information sent by the macro base station, to terminate data transmission with the UE.

Preferably, whether the UE is in the coverage hole of the serving small cell may be determined by using any one of the following three methods (1), (2), or (3):

(1) if it is continuously determined at least twice that an uplink of the UE is incorrectly demodulated, determining that the UE is in the coverage hole of the current serving small cell;

(2) if a received reference signal received power RSRP or reference signal received quality RSRQ sent by the UE is less than a preset threshold, determining that the UE is in the coverage hole of the current serving small cell, where the preset threshold is set as required, and is not limited in this embodiment of the present application; or (3) if a response message of the UE is not received continuously at least twice after a request message is sent to the UE, determining that the UE is in the coverage hole of the small cell.

It can be known from the foregoing that, by means of the inter-small cell handover method provided in this embodiment of the present application, a first synchronization pilot signal is sent to the UE, so that the UE measures the synchronization pilot signal, and determines an available small cell of the UE and an available beam pair of the available small cell, where the available beam pair consists of a high frequency beam of the available small cell and a high frequency beam of the UE; the available small cell receives a synchronization indication sent by a macro base station, where the synchronization indication instructs the available small cell to send a synchronization pilot signal to the UE on the high frequency beam in the available beam pair of the available small cell; the available small cell sends a second synchronization pilot signal to the UE according to the synchronization indication, so that the UE performs synchronous measurement on the high frequency beam of the UE in the available beam pair, determines an available target beam pair, and hands over from a current serving small cell of the UE to a target small cell corresponding to the available target beam pair; the target small cell receives a data transmission indication sent by the macro base station, to perform data transmission with the UE by using the available target beam pair. In this way, when the UE is in a coverage hole of the serving small cell, the UE needs to perform synchronous measurement only on the available beam pair in a set of available small cells, greatly reducing a quantity of synchronization times. Therefore, a delay of accessing a high frequency network by the UE is reduced, and QoS of receiving a high frequency service by the UE is improved.

An example of an inter-small cell handover in the high frequency network architecture shown in FIG. 1 is used below to describe the foregoing method in detail. It is assumed that a current serving small cell of the UE is a small cell 1, a set of available small cells includes a small cell 2 and a small cell 3, and when the UE is in a coverage hole of the serving small cell, a determined target small cell is the small cell 2.

Figure 5:
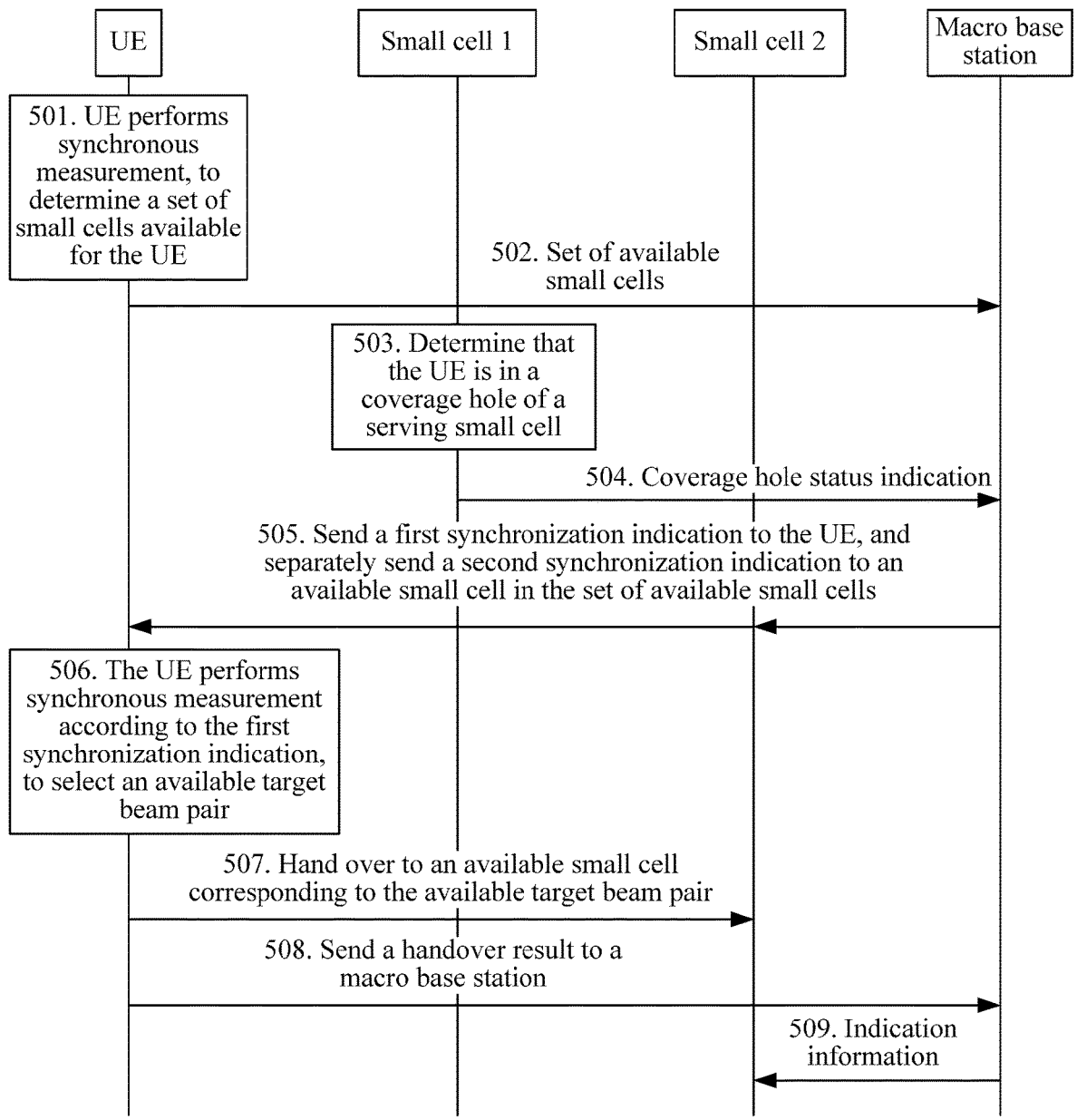
FIG. 5 is a flowchart of an inter-small cell handover method according to an embodiment of the present application.

FIG. 5 is a flowchart of an inter-small cell handover method according to an embodiment of the present application. As shown in FIG. 5, the method may include the following steps.

501. The UE performs synchronous measurement, to determine a set of small cells available for the UE.

The set of available small cells includes a small cell 2, a small cell 3, an available beam pair (a high frequency beam 2 of the UE, a high frequency beam 4 of the small cell 2) of the small cell 2, and an available beam pair (a high frequency beam 3 of the UE, a high frequency beam 6 of the small cell 3) of the small cell 3.

502. The UE sends the set of available small cells to a macro base station.

503. A small cell 1 determines that the UE is in a coverage hole of a serving small cell.

Preferably, the small cell 1 may determine, by using any one of the following three methods (1), (2), or (3), that the UE is in the coverage hole of the serving small cell:

(1) if it is continuously determined at least twice that an uplink of the UE is incorrectly demodulated, determining that the UE is in the coverage hole of the current serving small cell;

(2) if a received reference signal received power RSRP or reference signal received quality RSRQ sent by the UE is less than a preset threshold, determining that the UE is in the coverage hole of the current serving small cell, where the preset threshold is set as required, and is not limited in this embodiment of the present application; or (3) if a response message of the UE is not received continuously at least twice after a request message is sent to the UE, determining that the UE is in the coverage hole of the small cell.

504. The small cell 1 sends a coverage hole status indication to the macro base station.

505. The macro base station sends a first synchronization indication to the UE, and separately sends a second synchronization indication to each available small cell in the set of available small cells.

The first synchronization indication is used to instruct the UE to separately perform synchronous measurement on the high frequency beam of the UE in each available beam pair. The second synchronization indication is used to instruct the available small cell to send a synchronization pilot signal to the UE on the high frequency beam in the available beam pair of the available small cell.

506. The UE performs synchronous measurement according to the first synchronization indication, to select an available target beam pair (a high frequency beam 2 of the UE, a high frequency beam 4 of a small cell 2).

507. The UE hands over to the small cell 2: a target small cell corresponding to the available target beam pair.

508. The UE sends a handover result to the macro base station.

509. The macro base station sends indication information to the small cell 2 according to the handover result, where the indication information is used to instruct the small cell 2 to transmit high frequency data with the UE by using the available target beam pair.

It can be known from the foregoing that, by means of the inter-small cell handover method provided in this embodiment of the present application, the UE performs synchronous measurement, determines a set of small cells available for the UE, and sends the set of available small cells to a macro base station; when determining that the UE is in a coverage hole of a serving small cell, the serving small cell sends a coverage hole status indication to the macro base station; the macro base station sends a first synchronization indication to the UE, and separately sends a second synchronization indication to an available small cell in the set of available small cells; the UE performs synchronous measurement, selects a target beam pair, hands over to a target small cell corresponding to the target beam pair, and sends a handover result to the macro base station; the macro base station instructs the target small cell to transmit high frequency data to the UE. In this way, when the UE is in the coverage hole of the serving small cell, as long as the UE performs synchronous measurement on each available beam pair in the set of available small cells determined by the UE, the UE can select an optimal target small cell and target beam pair, and hands over to the target small cell, thereby reducing a delay of re-accessing a high frequency network by the UE, improving QoS of receiving a high frequency service by the UE, and avoiding a problem in the prior art that the UE needs to perform synchronous measurement on all beam pairs of all small cells, and a synchronous measurement time is long, causing a relatively large delay of re-accessing a high frequency network by the UE, and relatively poor QoS of receiving a high frequency service by the UE.

Figure 6:
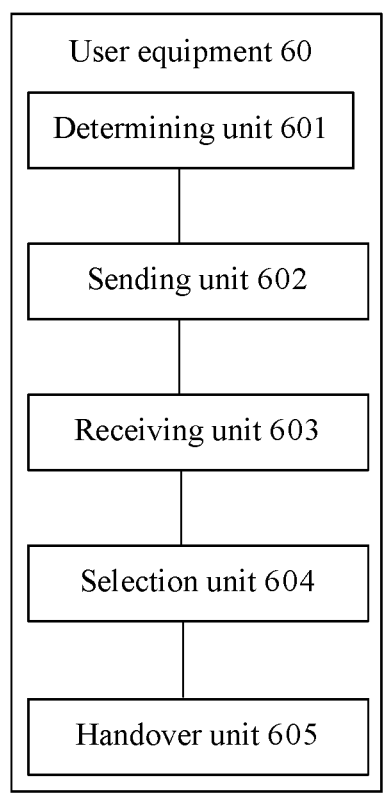
FIG. 6 is a structural diagram of user equipment 60 according to an embodiment of the present application.

In addition, an embodiment of the present application further provides user equipment 60. As shown in FIG. 6, the user equipment 60 may include:

a determining unit 601, configured to perform synchronous measurement, to determine a set of small cells available for the UE, where the set of available small cells includes at least one available small cell, and an available beam pair of each available small cell, and the available beam pair consists of a high frequency beam of the UE and a high frequency beam of the available small cell;

a sending unit 602, configured to send the set of available small cells to a macro base station;

a receiving unit 603, configured to: when the UE is in a coverage hole of a current serving small cell, receive a first synchronization indication sent by the macro base station, where the first synchronization indication is used to instruct the UE to perform synchronous measurement on the high frequency beam of the UE in each available beam pair;

a selection unit 604, configured to perform synchronous measurement according to the first synchronization indication, to select an available target beam pair; and a handover unit 605, configured to hand over to a target small cell corresponding to the available target beam pair.

Further, the determining unit 601 is specifically configured to:

send a synchronous measurement request to the macro base station, so that the macro base station instructs all small cells in a coverage area of the macro base station to send synchronization pilot signals to the UE;

separately receive, on each high frequency beam of the UE, the synchronization pilot signal sent by all the small cells on each high frequency beam of the small cells;

separately measure a signal strength of each synchronization pilot signal, and sort the signal strengths in descending order; and determine a small cell sending a synchronization pilot signal having a highest signal strength as a serving small cell of the UE; and determine at least one small cell sending a synchronization pilot signal having a second highest signal strength as an available small cell in the set of small cells available for the UE.

The signal strength may be a measured RSRP value of a reference signal of a current neighboring small cell or a measured RSRQ value of a reference signal of a current neighboring small cell.

For example, as shown in FIG. 1, after performing synchronous measurement, the UE determines the small cell 1 as the serving small cell of the UE, determines that available small cells in the set of available small cells are the small cell 2 and the small cell 3, determines that an available beam pair corresponding to the small cell 2 is (a high frequency beam 2 of the UE, a high frequency beam 4 of the small cell 2), and determines that an available beam pair corresponding to the small cell 3 is (a high frequency beam 3 of the UE, a high frequency beam 6 of the small cell 3).

Further, the selection unit 604 is specifically configured to:

measure a signal strength of a synchronization pilot signal on the high frequency beam of the UE in each available beam pair; and if the signal strength corresponding to the synchronization pilot signal having the highest signal strength is greater than or equal to a preset threshold, select, as the available target beam pair, a beam pair consisting of a high frequency beam, of the UE, on which the synchronization pilot signal having the highest signal strength is received and a high frequency beam of an available small cell sending the synchronization pilot signal having the highest signal strength.

The preset threshold is set as required, and is not limited in this embodiment of the present application. If a signal strength of a synchronization pilot signal is greater than or equal to the preset threshold, it indicates that quality of a channel on which the synchronization pilot signal is sent and received meets a requirement of a high frequency data transmission channel in the high frequency network architecture. If a signal strength of a synchronization pilot signal is less than the preset threshold, it indicates that quality of a channel on which the synchronization pilot signal is sent and received cannot meet a requirement of a high frequency data transmission channel in the high frequency network architecture, and the channel is an unavailable high frequency transmission channel.

For example, when the UE in FIG. 1 is in the coverage hole of the serving small cell, the UE needs to perform synchronous measurement only on the available beam pairs (the high frequency beam 2 of the UE, the high frequency beam 4 of the small cell 2) and (the high frequency beam 3 of the UE, the high frequency beam 6 of the small cell 3), to select an available target beam pair from the two beam pairs, that is, an optimal beam pair can be determined as long as synchronous measurement is performed twice. Compared with an existing method in which an optimal beam pair cannot be determined until synchronous measurement is performed 120 times, this greatly reduces a quantity of times of synchronous measurement, and reduces a synchronous measurement time. Therefore, a time is saved for a small cell handover of the UE, a delay of re-accessing a high frequency network by the UE is reduced, and QoS of receiving a high frequency service by the UE is improved.

Figure 6A:
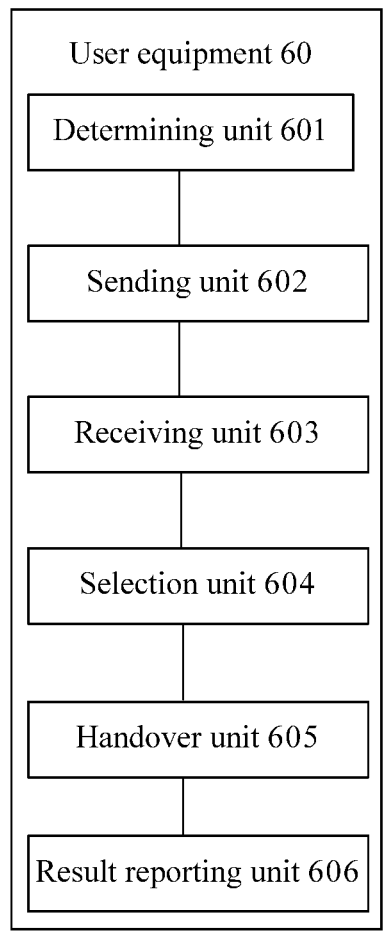
FIG. 6A is a structural diagram of user equipment 60 according to an embodiment of the present application.

Further, as shown in FIG. 6A, the user equipment further includes:

a result reporting unit 606, configured to send a handover result to the macro base station, so that the macro base station instructs, according to the handover result, to perform data transmission between the target small cell and the UE by using the available target beam pair, and instructs the serving small cell to terminate data transmission with the UE, where the handover result includes the available target beam pair and a cell identifier of the target small cell, where the receiving unit 603 is further configured to receive a data transmission indication sent by the macro base station, to perform data transmission with the target small cell by using the available target beam pair, where the data transmission indication is used to instruct to perform data transmission between the target small cell and the UE by using the available target beam pair.

It can be known from the foregoing that, the user equipment 60 provided in this embodiment of the present application first performs synchronous measurement, to determine a set of small cells available for the UE; sends the set of available small cells to a macro base station; when the UE is in a coverage hole of a serving small cell, receives a first synchronization indication sent by the macro base station; performs synchronous measurement according to the first synchronization indication, to select an available target beam pair; and hands over to a target small cell corresponding to the available target beam pair. In this way, when the UE is in the coverage hole of the serving small cell, as long as the UE performs synchronous measurement on each available beam pair in the set of available small cells determined by the UE, the UE can select an optimal target small cell and target beam pair, and hands over to the target small cell, thereby reducing a delay of re-accessing a high frequency network by the UE, improving QoS of receiving a high frequency service by the UE, and avoiding a problem in the prior art that the UE needs to perform synchronous measurement on all beam pairs of all small cells, and a synchronous measurement time is long, causing a relatively large delay of re-accessing a high frequency network by the UE, and relatively poor QoS of receiving a high frequency service by the UE.

Figure 7:
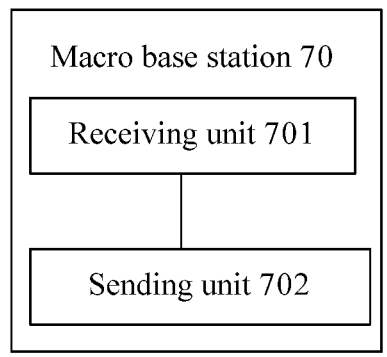
FIG. 7 is a structural diagram of a macro base station 70 according to an embodiment of the present application.

In addition, an embodiment of the present application further provides a macro base station 70. As shown in FIG. 7, the macro base station 70 may include:

a receiving unit 701, configured to: receive a set of available small cells sent by UE, where the set of available small cells includes at least one available small cell, and an available beam pair of each available small cell, and the available beam pair consists of a high frequency beam of the UE and a high frequency beam of the available small cell; and receive a coverage hole status indication sent by a serving small cell of the UE, where the coverage hole status indication is used to indicate that the UE is in a coverage hole of the serving small cell; and a sending unit 702, configured to: send a first synchronization indication to the UE, and separately send a second synchronization indication to each available small cell in the set of available small cells, so that the UE performs synchronous measurement according to the first synchronization indication, to select an available target beam pair, where the first synchronization indication is used to instruct the UE to perform synchronous measurement on the high frequency beam of the UE in each available beam pair, and the second synchronization indication is used to instruct the available small cell to send a synchronization pilot signal to the UE on the high frequency beam in the available beam pair of the available small cell.

Figure 7A:
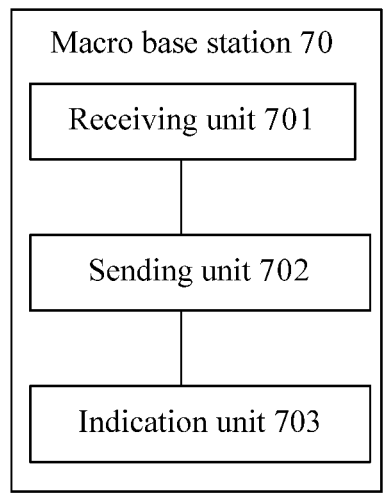
FIG. 7A is a structural diagram of a macro base station 70 according to an embodiment of the present application.

Further, the receiving unit 701 is further configured to receive a handover result sent by the UE, where the handover result includes the available target beam pair and a cell identifier of the target small cell; and correspondingly, as shown in FIG. 7A, the macro base station further includes:

an indication unit 703, configured to: instruct, according to the handover result, to perform data transmission between the target small cell and the UE by using the available target beam pair, and instruct the serving small cell to terminate data transmission with the UE.

Figure 7B:
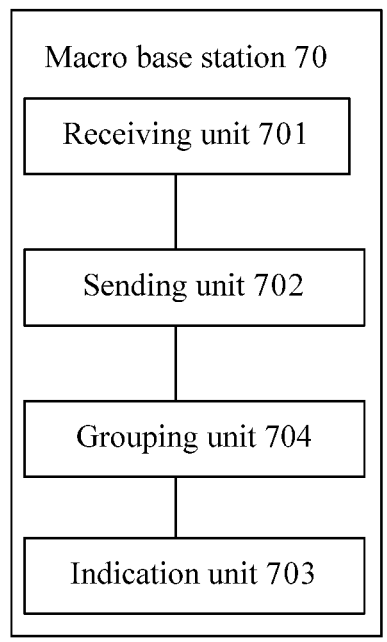
FIG. 7B is a structural diagram of a macro base station 70 according to an embodiment of the present application.

Further, to ensure that the UE receives, as quickly as possible when the UE is in the coverage hole of the serving small cell, data transmitted by another small cell on a high frequency channel, and reduces a connection delay of a high frequency data service, as shown in FIG. 7B, the macro base station further includes:

a grouping unit 704, configured to: before the indication unit 703 instructs, according to the handover result, to perform data transmission between the target small cell and the UE by using the available target beam pair, group, into one group, an available small cell that is in the set of available small cells and that is in a same coverage area of the macro base station, where the sending unit 702 is further configured to: after the macro base station receives a coverage hole status indication sent by the serving small cell of the UE, separately send, in a multicast form to each group of available small cells, data that the UE requests to transmit.

In this way, before synchronous measurement is performed on a UE side to determine the available target beam pair, the macro base station first sends, in a multicast form to each small cell in the set of available small cells, the data requested by the UE, so that after receiving the handover result, the macro base station directly commands the target small cell to perform data transmission to the UE, avoiding a waste of time caused by that the data requested by the UE is transmitted to the target small cell by the macro base station only after the handover result is received, to enable the target small cell to perform data transmission to the UE.

It can be known from the foregoing that, the macro base station 70 provided in this embodiment of the present application receives a set of available small cells sent by the UE, and after receiving a coverage hole status indication sent by a serving small cell, the macro base station sends a first synchronization indication to the UE, and separately sends a second synchronization indication to each available small cell in the set of available small cells, so that the UE performs synchronous measurement according to the first synchronization indication, to select an available target beam pair. The first synchronization indication is used to instruct the UE to perform synchronous measurement on a high frequency beam of the UE in each available beam pair, and the second synchronization indication is used to instruct the available small cell to send a synchronization pilot signal to the UE on a high frequency beam in the available beam pair of the available small cell. In this way, after the macro base station receives information that is sent by the serving small cell and that the UE is in a coverage hole of the serving small cell, the macro base station commands the UE to perform synchronous measurement on the available beam pair in the determined set of available small cells, so that a quantity of times of synchronous measurement performed by the UE is greatly reduced, and a measurement time is reduced. Therefore, a delay of re-accessing a high frequency network by the UE is reduced, and high frequency QoS of the UE is improved.

Figure 8:
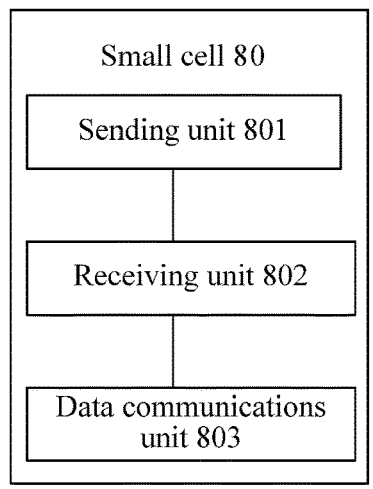
FIG. 8 is a structural diagram of a small cell 80 according to an embodiment of the present application.

In addition, an embodiment of the present application provides a small cell 80. As shown in FIG. 8, the small cell 80 includes: a sending unit 801, a receiving unit 802, and a data communications unit 803.

The sending unit 801 is configured to send a first synchronization pilot signal to the UE, so that the UE measures the synchronization pilot signal, and determines an available small cell of the UE and an available beam pair of the available small cell.

The available beam pair consists of a high frequency beam of the available small cell and a high frequency beam of the UE.

The receiving unit 802 is configured to receive a synchronization indication sent by a macro base station, where the synchronization indication instructs the available small cell to send a synchronization pilot signal to the UE on the high frequency beam in the available beam pair of the available small cell.

The sending unit 801 is further configured to send a second synchronization pilot signal to the UE according to the synchronization indication, so that the UE performs synchronous measurement on the high frequency beam of the UE in the available beam pair, determines an available target beam pair, and hands over from a current serving small cell of the UE to a target small cell corresponding to the available target beam pair.

The receiving unit 802 is further configured to receive a data transmission indication sent by the macro base station.

The data communications unit 803 is configured to perform data transmission with the UE by using the available target beam pair.

Further, the receiving unit 802 is further configured to: before the receiving unit receives the data transmission indication sent by the macro base station, receive data that is sent by the macro base station in a multicast form and that the UE requests to transmit.

Figure 8A:
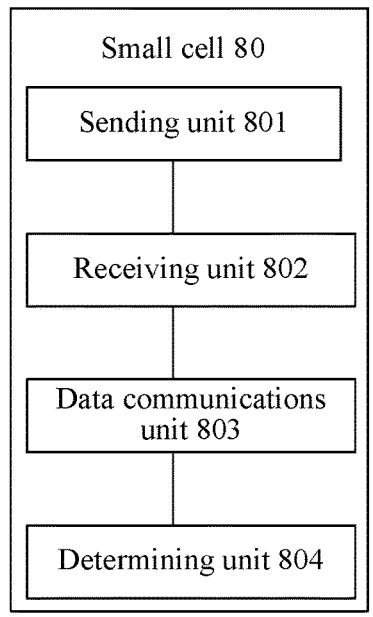
FIG. 8A is a structural diagram of a small cell 80 according to an embodiment of the present application.

Further, when the small cell 80 is the current serving small cell of the UE, as shown in FIG. 8A, the small cell 80 further includes:

a determining unit 804, configured to determine whether the UE is in a coverage hole of the current serving small cell, where the sending unit 801 is further configured to send a coverage hole status indication to the macro base station, where the coverage hole status indication is used to indicate whether the UE is in the coverage hole of the small cell; and the receiving unit 802 is further configured to: when the UE is in the coverage hole of the current serving small cell, receive, by the small cell, indication information sent by the macro base station, to terminate data transmission with the UE.

Further, the determining unit 804 is specifically configured to:

if it is continuously determined at least twice that an uplink of the UE is incorrectly demodulated, determine that the UE is in the coverage hole of the current serving small cell; or if a received reference signal received power RSRP or reference signal received quality RSRQ sent by the UE is less than a preset threshold, determine that the UE is in the coverage hole of the current serving small cell, where the preset threshold is set as required, and is not limited in this embodiment of the present application; or if a response message of the UE is not received continuously at least twice after a request message is sent to the UE, determine that the UE is in the coverage hole of the small cell.

It can be known from the foregoing that, the small cell 80 provided in this embodiment of the present application sends a first synchronization pilot signal to the UE, so that the UE measures the synchronization pilot signal, and determines an available small cell of the UE and an available beam pair of the available small cell, where the available beam pair consists of a high frequency beam of the available small cell and a high frequency beam of the UE; the available small cell receives a synchronization indication sent by a macro base station, where the synchronization indication instructs the available small cell to send a synchronization pilot signal to the UE on the high frequency beam in the available beam pair of the available small cell; the available small cell sends a second synchronization pilot signal to the UE according to the synchronization indication, so that the UE performs synchronous measurement on the high frequency beam of the UE in the available beam pair, determines an available target beam pair, and hands over from a current serving small cell of the UE to a target small cell corresponding to the available target beam pair; the target small cell receives a data transmission indication sent by the macro base station, to perform data transmission with the UE by using the available target beam pair. In this way, when the UE is in a coverage hole of the serving small cell, the UE needs to perform synchronous measurement only on the available beam pair in a set of available small cells, greatly reducing a quantity of synchronization times. Therefore, a delay of accessing a high frequency network by the UE is reduced, and QoS of receiving a high frequency service by the UE is improved.

Figure 9:
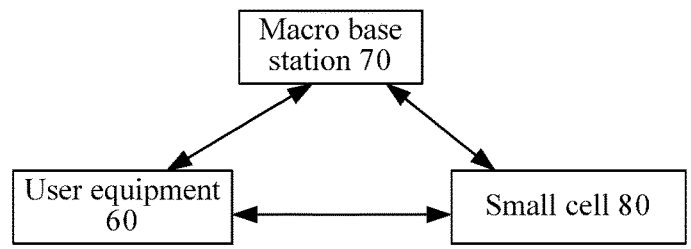
FIG. 9 is a structural diagram of an inter-small cell handover system 90 according to an embodiment of the present application.

In addition, an embodiment of the present application provides an inter-small cell handover system 90. As shown in FIG. 9, the inter-small cell handover system 90 may include user equipment 60, a macro base station 70, at least one serving small cell 80, and at least one available small cell 0, where the user equipment 60, the macro base station 70, and the small cell 80 are respectively the same as the user equipment 60, the macro base station 70, and the small cell 80 that are in the foregoing, and are not described herein again.

It can be known from the foregoing that, by means of the inter-small cell handover system 90 provided in this embodiment of the present application, the UE 60 performs synchronous measurement, determines a set of small cells available for the UE 60, and sends the set of available small cells to the macro base station 70; when determining that the UE is in a coverage hole of a serving small cell, the small cell 80 sends a coverage hole status indication to the macro base station 70; the macro base station 70 sends a first synchronization indication to the UE, and sends a second synchronization indication to an available small cell in the set of available small cells; the UE 60 performs synchronous measurement, determines an available target beam pair, and hands over to a target small cell corresponding to the available target beam pair. In this way, when the UE is in the coverage hole of the serving small cell, as long as the UE performs synchronous measurement on each available beam pair in the set of available small cells determined by the UE, the UE can select an optimal target small cell and target beam pair, and hands over to the target small cell, thereby reducing a delay of re-accessing a high frequency network by the UE, improving QoS of receiving a high frequency service by the UE, and avoiding a problem in the prior art that the UE needs to perform synchronous measurement on all beam pairs of all small cells, and a synchronous measurement time is long, causing a relatively large delay of re-accessing a high frequency network by the UE, and relatively poor QoS of receiving a high frequency service by the UE.

Figure 10:
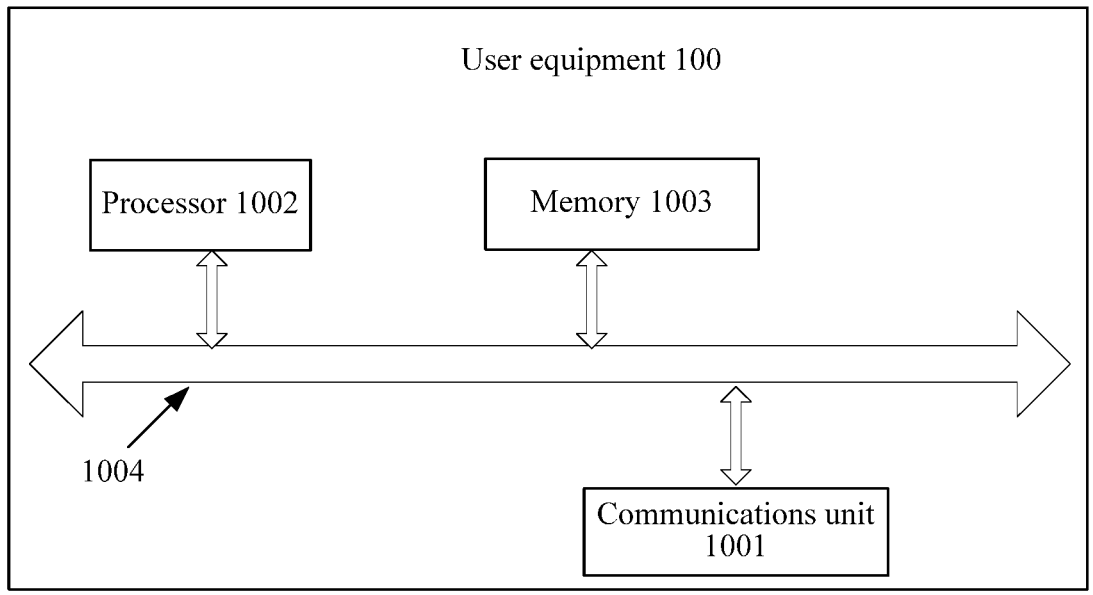
FIG. 10 is a structural diagram of user equipment 100 according to an embodiment of the present application.

In addition, an embodiment of the present application further provides user equipment 100. As shown in FIG. 10, the user equipment 100 may include: a communications unit 1001, a processor 1002, a memory 1003, and at least one communications bus 1004, which is configured to implement a connection and mutual communication between these apparatuses.

The processor 1002 may be a central processing unit (CPU).

The memory 1003 may be a volatile memory, such as a random-access memory RAM for short); or a non-volatile memory, such as a read-only memory (ROM), a flash memory, a hard disk drive (HDD) or a solid-state drive (SSD); or a combination of the foregoing types of memories; and provides instructions and data for the processor 1002.

The processor 1002 is configured to perform synchronous measurement, to determine a set of small cells available for the UE.

The set of available small cells includes at least one available small cell, and an available beam pair of each available small cell, and the available beam pair consists of a high frequency beam of the UE and a high frequency beam of the available small cell.

The communications unit 1001 is configured to: send the set of available small cells to a macro base station; and when the UE is in a coverage hole of a current serving small cell, receive a first synchronization indication sent by the macro base station.

The first synchronization indication is used to instruct the UE to perform synchronous measurement on the high frequency beam of the UE in each available beam pair.

The processor 1002 is further configured to perform synchronous measurement according to the first synchronization indication, to select an available target beam pair; and hand over to a target small cell corresponding to the available target beam pair.

Further, the processor 1002 is specifically configured to:
send a synchronous measurement request to the macro base station, so that the macro base station instructs all small cells in a coverage area of the macro base station to send synchronization pilot signals to the UE;

separately receive, on each high frequency beam of the UE, the synchronization pilot signal sent by all the small cells on each high frequency beam of the small cells;

separately measure a signal strength of each synchronization pilot signal, and sort the signal strengths in descending order; and determine a small cell sending a synchronization pilot signal having a highest signal strength as a serving small cell of the UE; and determine at least one small cell sending a synchronization pilot signal having a second highest signal strength as an available small cell in the set of small cells available for the UE.

The signal strength may be a measured RSRP value of a reference signal of a current neighboring small cell or a measured RSRQ value of a reference signal of a current neighboring small cell.

For example, as shown in FIG. 1, after performing synchronous measurement, the UE determines the small cell 1 as the serving small cell of the UE, determines that available small cells in the set of available small cells are the small cell 2 and the small cell 3, determines that an available beam pair corresponding to the small cell 2 is (a high frequency beam 2 of the UE, a high frequency beam 4 of the small cell 2), and determines that an available beam pair corresponding to the small cell 3 is (a high frequency beam 3 of the UE, a high frequency beam 6 of the small cell 3).

Further, the processor 1002 is specifically configured to:
measure a signal strength of a synchronization pilot signal on the high frequency beam of the UE in each available beam pair; and if the signal strength corresponding to the synchronization pilot signal having the highest signal strength is greater than or equal to a preset threshold, select, as the available target beam pair, a beam pair consisting of a high frequency beam, of the UE, on which the synchronization pilot signal having the highest signal strength is received and a high frequency beam of an available small cell sending the synchronization pilot signal having the highest signal strength.

The preset threshold is set as required, and is not limited in this embodiment of the present application. If a signal strength of a synchronization pilot signal is greater than or equal to the preset threshold, it indicates that quality of a channel on which the synchronization pilot signal is sent and received meets a requirement of a high frequency data transmission channel in the high frequency network architecture. If a signal strength of a synchronization pilot signal is less than the preset threshold, it indicates that quality of a channel on which the synchronization pilot signal is sent and received cannot meet a requirement of a high frequency data transmission channel in the high frequency network architecture, and the channel is an unavailable high frequency transmission channel.

For example, when the UE in FIG. 1 is in the coverage hole of the serving small cell, the UE needs to perform synchronous measurement only on the available beam pairs (the high frequency beam 2 of the UE, the high frequency beam 4 of the small cell 2) and (the high frequency beam 3 of the UE, the high frequency beam 6 of the small cell 3), to select an available target beam pair from the two beam pairs, that is, an optimal beam pair can be determined as long as synchronous measurement is performed twice. Compared with an existing method in which an optimal beam pair cannot be determined until synchronous measurement is performed 120 times, this greatly reduces a quantity of times of synchronous measurement, and reduces a synchronous measurement time. Therefore, a time is saved for a small cell handover of the UE, a delay of re-accessing a high frequency network by the UE is reduced, and QoS of receiving a high frequency service by the UE is improved.

Further, the communications unit 1001 is further configured to: send a handover result to the macro base station, so that the macro base station instructs, according to the handover result, to perform data transmission between the target small cell and the UE by using the available target beam pair, and instructs the serving small cell to terminate data transmission with the UE, where the handover result includes the available target beam pair and a cell identifier of the target small cell; and receive a data transmission indication sent by the macro base station, to perform data transmission with the target small cell by using the available target beam pair, where the data transmission indication is used to instruct to perform data transmission between the target small cell and the UE by using the available target beam pair.

It can be known from the foregoing that, the user equipment 100 provided in this embodiment of the present application first performs synchronous measurement, to determine a set of small cells available for the UE; sends the set of available small cells to a macro base station; when the UE is in a coverage hole of a serving small cell, receives a first synchronization indication sent by the macro base station; performs synchronous measurement according to the first synchronization indication, to select an available target beam pair; and hands over to a target small cell corresponding to the available target beam pair. In this way, when the UE is in the coverage hole of the serving small cell, as long as the UE performs synchronous measurement on each available beam pair in the set of available small cells determined by the UE, the UE can select an optimal small cell and beam pair, access the selected small cell, and continuously perform high frequency data transmission by using the selected beam pair, thereby reducing a synchronous measurement time, further reducing a delay of re-accessing a high frequency network by the UE, improving QoS of receiving a high frequency service by the UE, and avoiding a problem in the prior art that the UE needs to perform synchronous measurement on all beam pairs of all small cells, and a synchronous measurement time is long, causing a relatively large delay of re-accessing a high frequency network by the UE, and relatively poor QoS of receiving a high frequency service by the UE.

Figure 11:
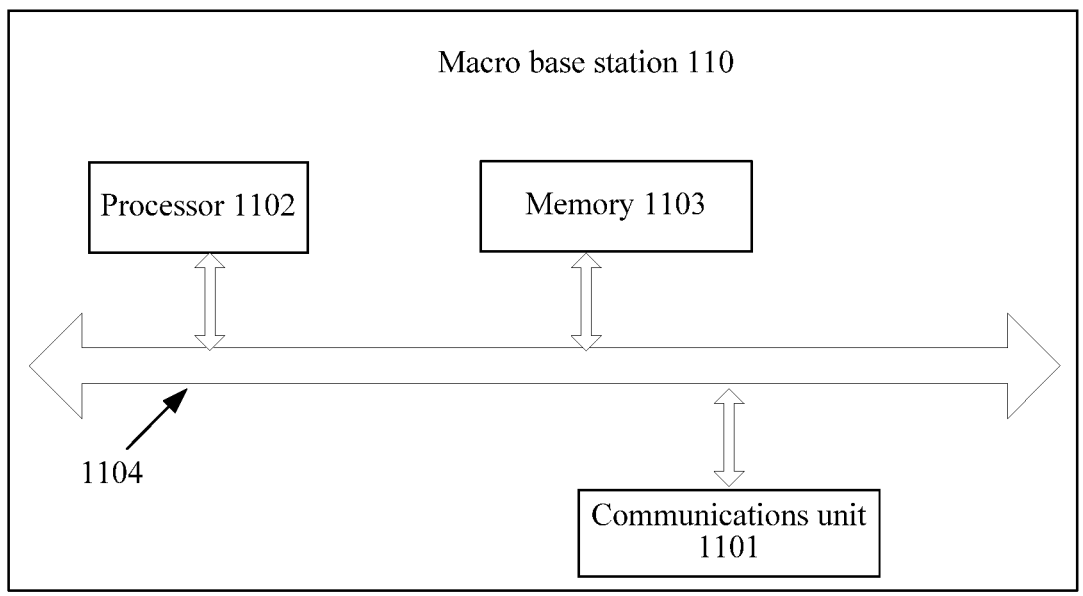
FIG. 11 is a structural diagram of a macro base station 110 according to an embodiment of the present application.

In addition, an embodiment of the present application further provides a macro base station 110. As shown in FIG. 11, the macro base station 110 may include: a communications unit 1101, a processor 1102, a memory 1103, and at least one communications bus 1104, which is configured to implement a connection and mutual communication between these apparatuses.

The processor 1102 may be a central processing unit (CPU).

The memory 1103 may be a volatile memory, such as a random-access memory (RAM); or a non-volatile memory, such as a read-only memory (ROM), a flash memory, a hard disk drive (HDD) or a solid-state drive (SSD); or a combination of the foregoing types of memories; and provides instructions and data for the processor 1102.

The communications unit 1101 is configured to: receive a set of available small cells sent by the UE, where the set of available small cells includes at least one available small cell, and an available beam pair of each available small cell, and the available beam pair consists of a high frequency beam of the UE and a high frequency beam of the available small cell;

receive a coverage hole status indication sent by a serving small cell of the UE, where the coverage hole status indication is used to indicate that the UE is in a coverage hole of the serving small cell; and send a first synchronization indication to the UE, and separately send a second synchronization indication to each available small cell in the set of available small cells, so that the UE performs synchronous measurement according to the first synchronization indication, to select an available target beam pair, where the first synchronization indication is used to instruct the UE to perform synchronous measurement on the high frequency beam of the UE in each available beam pair, and the second synchronization indication is used to instruct the available small cell to send a synchronization pilot signal to the UE on the high frequency beam in the available beam pair of the available small cell.

Further, the communications unit 1101 is further configured to receive a handover result sent by the UE, where the handover result includes the available target beam pair and a cell identifier of the target small cell; and correspondingly, the processor 1102 is configured to: instruct, according to the handover result, to perform data transmission between the target small cell and the UE by using the available target beam pair, and instruct the serving small cell to terminate data transmission with the UE.

Further, to ensure that the UE receives, as quickly as possible when the UE is in the coverage hole of the serving small cell, data transmitted by another small cell on a high frequency channel, and reduces a connection delay of a high frequency data service, the processor 1102 is further configured to: before the indication unit instructs, according to the handover result, to perform data transmission between the target small cell and the UE by using the available target beam pair, group, into one group, an available small cell that is in the set of available small cells and that is in a same coverage area of the macro base station; and the communications unit 1101 is further configured to: after the macro base station receives a coverage hole status indication sent by the serving small cell of the UE, separately send, in a multicast form to each group of available small cells, data that the UE requests to transmit.

In this way, before synchronous measurement is performed on a UE side to determine the available target beam pair, the macro base station first sends, in a multicast form to each small cell in the set of available small cells, the data requested by the UE, so that after receiving the handover result, the macro base station directly commands the target small cell to perform data transmission to the UE, avoiding a waste of time caused by that the data requested by the UE is transmitted to the target small cell by the macro base station only after the handover result is received, to enable the target small cell to perform data transmission to the UE.

It can be known from the foregoing that, the macro base station 110 provided in this embodiment of the present application receives a set of available small cells sent by the UE, and after receiving a coverage hole status indication sent by a serving small cell, the macro base station sends a first synchronization indication to the UE, and separately sends a second synchronization indication to each available small cell in the set of available small cells, so that the UE performs synchronous measurement according to the first synchronization indication, to select an available target beam pair. The first synchronization indication is used to instruct the UE to perform synchronous measurement on a high frequency beam of the UE in each available beam pair, and the second synchronization indication is used to instruct the available small cell to send a synchronization pilot signal to the UE on a high frequency beam in the available beam pair of the available small cell. In this way, after the macro base station receives information that is sent by the serving small cell and that the UE is in a coverage hole of the serving small cell, the macro base station commands the UE to perform synchronous measurement on the available beam pair in the determined set of available small cells, so that a quantity of times of synchronous measurement performed by the UE is greatly reduced, and a measurement time is reduced. Therefore, a delay of re-accessing a high frequency network by the UE is reduced, and high frequency QoS of the UE is improved.

Figure 12:
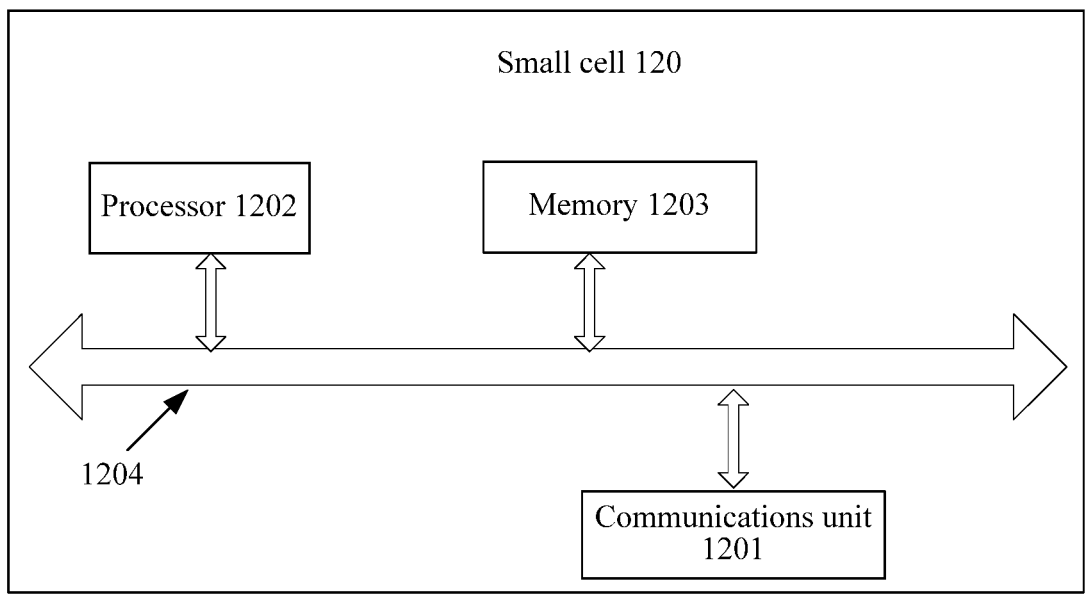
FIG. 12 is a structural diagram of a small cell 120 according to an embodiment of the present application.

In addition, an embodiment of the present application further provides a small cell 120. As shown in FIG. 12, the small cell 120 may include: a communications unit 1201, a processor 1202, a memory 1203, and at least one communications bus 1204, which is configured to implement a connection and mutual communication between these apparatuses.

The processor 1202 may be a central processing unit (CPU).

The memory 1203 may be a volatile memory, such as a random-access memory (RAM); or a non-volatile memory, such as a read-only memory (ROM), a flash memory, a hard disk drive (HDD) or a solid-state drive (SSD); or a combination of the foregoing types of memories; and provides instructions and data for the processor 1202.

The processor 1202 is configured to determine that UE is in a coverage hole of a serving small cell.

The communications unit 1201 sends a first synchronization pilot signal to the UE, so that the UE measures the synchronization pilot signal, and determines an available small cell of the UE and an available beam pair of the available small cell.

The available beam pair consists of a high frequency beam of the available small cell and a high frequency beam of the UE.

The communications unit 1201 is further configured to: receive a synchronization indication sent by a macro base station, where the synchronization indication instructs the available small cell to send a synchronization pilot signal to the UE on the high frequency beam in the available beam pair of the available small cell;

send a second synchronization pilot signal to the UE according to the synchronization indication, so that the UE performs synchronous measurement on the high frequency beam of the UE in the available beam pair, determines an available target beam pair, and hands over from a current serving small cell of the UE to a target small cell corresponding to the available target beam pair;

receive a data transmission indication sent by the macro base station; and perform data transmission with the UE by using the available target beam pair.

Further, the communications unit 1201 is further configured to: before the receiving unit receives the data transmission indication sent by the macro base station, receive data that is sent by the macro base station in a multicast form and that the UE requests to transmit.

Further, when the small cell 120 is the current serving small cell of the UE, the processor 1202 is configured to determine whether the UE is in a coverage hole of the current serving small cell; and the communications unit 1201 is further configured to: send a coverage hole status indication to the macro base station, where the coverage hole status indication is used to indicate whether the UE is in the coverage hole of the small cell; and when the UE is in the coverage hole of the current serving small cell, receive, by the small cell, indication information sent by the macro base station, to terminate data transmission with the UE.

Further, the processor 1202 is specifically configured to:

if it is continuously determined at least twice that an uplink of the UE is incorrectly demodulated, determine that the UE is in the coverage hole of the current serving small cell; or if a received reference signal received power RSRP or reference signal received quality RSRQ sent by the UE is less than a preset threshold, determine that the UE is in the coverage hole of the current serving small cell, where the preset threshold is set as required, and is not limited in this embodiment of the present application; or if a response message of the UE is not received continuously at least twice after a request message is sent to the UE, determine that the UE is in the coverage hole of the small cell.

It can be known from the foregoing that, the small cell 120 provided in this embodiment of the present application sends a first synchronization pilot signal to UE, so that the UE measures the synchronization pilot signal, and determines an available small cell of the UE and an available beam pair of the available small cell, where the available beam pair consists of a high frequency beam of the available small cell and a high frequency beam of the UE; the available small cell receives a synchronization indication sent by a macro base station, where the synchronization indication instructs the available small cell to send a synchronization pilot signal to the UE on the high frequency beam in the available beam pair of the available small cell; the available small cell sends a second synchronization pilot signal to the UE according to the synchronization indication, so that the UE performs synchronous measurement on the high frequency beam of the UE in the available beam pair, determines an available target beam pair, and hands over from a current serving small cell of the UE to a target small cell corresponding to the available target beam pair; the target small cell receives a data transmission indication sent by the macro base station, to perform data transmission with the UE by using the available target beam pair. In this way, when the UE is in a coverage hole of the serving small cell, the UE needs to perform synchronous measurement only on the available beam pair in a set of available small cells, greatly reducing a quantity of synchronization times. Therefore, a delay of accessing a high frequency network by the UE is reduced, and QoS of receiving a high frequency service by the UE is improved.

Figure 13:
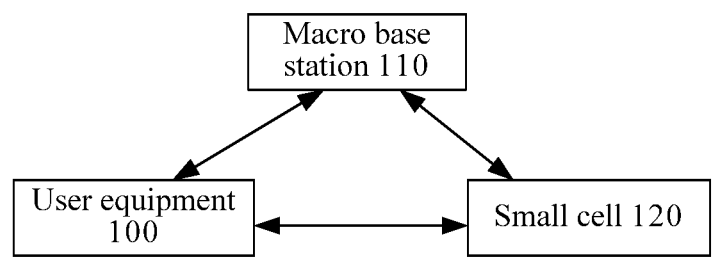
FIG. 13 is a structural diagram of an inter-small cell handover system 130 according to an embodiment of the present application.

In addition, an embodiment of the present application provides an inter-small cell handover system 130. As shown in FIG. 13, the inter-small cell handover system 130 may include user equipment 100, a macro base station 110, and at least one small cell 120, where the user equipment 100, the macro base station 110, and the small cell 120 are respectively the same as the user equipment 100, the macro base station 110, and the small cell 120 that are in the foregoing, and are not described herein again.

It can be known from the foregoing that, by means of the inter-small cell handover system 130 provided in this embodiment of the present application, the UE 100 performs synchronous measurement, determines a set of small cells available for the UE 100, and sends the set of available small cells to the macro base station 110; when determining that the UE is in a coverage hole of a serving small cell, the small cell 120 sends a coverage hole status indication to the macro base station 110; the macro base station 110 sends a first synchronization indication to the UE, and separately sends a second synchronization indication to an available small cell in the set of available small cells; the UE 100 performs synchronous measurement, determines an available target beam pair, and hands over to a target small cell corresponding to the available target beam pair. In this way, when the UE is in the coverage hole of the serving small cell, as long as the UE performs synchronous measurement on each available beam pair in the set of available small cells determined by the UE, the UE can select an optimal small cell and beam pair, access the selected small cell, and continuously perform high frequency data transmission by using the selected beam pair, thereby reducing a synchronous measurement time, further reducing a delay of re-accessing a high frequency network by the UE, improving QoS of receiving a high frequency service by the UE, and avoiding a problem in the prior art that the UE needs to perform synchronous measurement on all beam pairs of all small cells, and a synchronous measurement time is long, causing a relatively large delay of re-accessing a high frequency network by the UE, and relatively poor QoS of receiving a high frequency service by the UE.

In the several embodiments provided in the present application, it should be understood that the disclosed system, mobile terminal, and method may be implemented in other manners. For example, the described mobile terminal embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the mobile terminals or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments. In addition, functional units in the embodiments of the present application may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

Finally, it should be noted that, the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A method for determining an available small cell for a user equipment (UE), the method comprising:
sending, by the UE, a synchronous measurement request to a macro base station, which causes the macro base station to instruct each small cell in a coverage area of the macro base station to send synchronization pilot signals to the UE;
receiving, by the UE on a high frequency beam of the UE, the synchronization pilot signal sent by each of the small cells on a high frequency beam of each of the small cells;
measuring, by the UE, a signal strength of each synchronization pilot signal, and sorting the signal strengths in descending order;
determining, by the UE, a first small cell sending a first synchronization pilot signal having a highest signal strength as a serving small cell of the UE;
determining, by the UE, at least one second small cell sending a second synchronization pilot signal having a second highest signal strength as an available small cell in a set of available small cells for the UE;
sending, by the UE, information corresponding to the set of available small cells to the macro base station; and
in response to determining that the UE is in a coverage hole of a current serving small cell, receiving, by the UE, a first synchronization indication from the macro base station, wherein the first synchronization indication is used to instruct the UE to perform synchronous measurement on the high frequency beam of the UE with the high frequency beam of each small cell in the set of available small cells.

2. The method according to claim 1, further comprising:
performing, by the UE, synchronous measurement according to the first synchronization indication;
selecting, by the UE, an available small cell in the set of available small cells based on the synchronous measurement.

3. The method according to claim 2, further comprises:
measuring, by the UE, a signal strength of a synchronization pilot signal on the high frequency beam of the UE with each small cell in the set of available small cells; and
if the signal strength corresponding to the synchronization pilot signal having the highest signal strength is greater than or equal to a preset threshold, selecting, as an available target beam pair, a beam pair consisting of the high frequency beam of the UE, on which the synchronization pilot signal having the highest signal strength is received and the high frequency beam of the available small cell sending the synchronization pilot signal having the highest signal strength.

4. A user equipment (UE), comprising:
one or more memories configured to store instructions; and one or more processors coupled to the one or more memories and configured to execute the instructions to cause the UE to:

send a synchronous measurement request to a macro base station, which causes the macro base station to instruct each small cell in a coverage area of the macro base station to send synchronization pilot signals to the UE;

receive, on a high frequency beam of the UE, the synchronization pilot signal sent by each of the small cells on a high frequency beam of each of the small cells;

measure a signal strength of each synchronization pilot signal, and sort the signal strengths in descending order;

determine a first small cell sending a first synchronization pilot signal having a highest signal strength as a serving small cell of the UE;

determine at least one second small cell sending a synchronization pilot signal having a second highest signal strength as an available small cell in a set of available small cells for the UE;

send information corresponding to the set of available small cells to a macro base station; and in response to determining that the UE is in a coverage hole of a current serving small cell, receive a first synchronization indication from the macro base station, wherein the first synchronization indication is used to instruct the UE to perform synchronous measurement on the high frequency beam of the UE with the high frequency beam of each small cell in the set of available small cells.

5. The user equipment according to claim 4, wherein the one or more processors are further configured to execute the program instructions to cause the UE to:

perform synchronous measurement according to the first synchronization indication; and select an available small cell in the set of available small cells based on the synchronous measurement.

6. The user equipment according to claim 5, wherein the one or more processors are further configured to execute the program instructions to cause the UE to:

measure a signal strength of a synchronization pilot signal on the high frequency beam of the UE with each small cell in the set of available small cells; and if the signal strength corresponding to the synchronization pilot signal having the highest signal strength is greater than or equal to a preset threshold, select, as an available target beam pair, a beam pair consisting of the high frequency beam of the UE, on which the synchronization pilot signal having the highest signal strength is received and the high frequency beam of the available small cell sending the synchronization pilot signal having the highest signal strength.

* * * * *